(12) United States Patent
Yuan

(10) Patent No.: US 10,686,843 B2
(45) Date of Patent: Jun. 16, 2020

(54) AUTHORIZATION POLICY RECOMMENDATION METHOD AND APPARATUS, SERVER, AND STORAGE MEDIUM

(71) Applicant: TENCENT TECHNOLOGY (SHENZHEN) COMPANY LIMITED, Shenzhen (CN)

(72) Inventor: Zhe Yuan, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 16/296,167

(22) Filed: Mar. 7, 2019

(65) Prior Publication Data
US 2019/0207985 A1    Jul. 4, 2019

Related U.S. Application Data

(63) Continuation of application No. PCT/CN2017/114290, filed on Dec. 1, 2017.

(30) Foreign Application Priority Data

Dec. 8, 2016 (CN) .......................... 2016 1 1124782

(51) Int. Cl.
*H04L 29/06* (2006.01)
*G06N 20/00* (2019.01)
*G06N 5/02* (2006.01)

(52) U.S. Cl.
CPC ............. *H04L 63/205* (2013.01); *G06N 5/02* (2013.01); *G06N 20/00* (2019.01); *H04L 63/102* (2013.01)

(58) Field of Classification Search
CPC ....... H04L 63/08; H04L 63/20; H04L 63/102; H04L 63/205; G06N 20/00; G06N 5/02; G06F 21/577
See application file for complete search history.

(56) References Cited

U.S. PATENT DOCUMENTS 8,694,540 B1 * 4/2014 Lin ....................... G06F 16/211
707/777
9,628,539 B2 * 4/2017 van Coppenolle .... G06Q 30/06
(Continued)

FOREIGN PATENT DOCUMENTS

CN        102307205 A      1/2012
CN        103069410 A      4/2013
(Continued)

OTHER PUBLICATIONS

The World Intellectual Property Organization (WIPO) International Search Report for PCT/CN2017/114290 dated Jan. 31, 2018 5 Pages (including translation).
(Continued)

*Primary Examiner* — Hosuk Song
(74) *Attorney, Agent, or Firm* — Anova Law Group, PLLC

(57) ABSTRACT

An authorization policy recommendation method is provided. The method includes obtaining account data based on a cloud service, provided authorization policy data, and service data; and extracting an account feature, an authorization policy feature, and a service feature according to the account data, the provided authorization policy data, and the service data. The method further includes generating a combined feature based on the account data, the provided authorization policy data, and the service data; performing model training according to the account feature, the authorization policy feature, the service feature, and the combined feature, to generate a policy predictive recommendation
(Continued)

model; and performing predictive recommendation according to context scenario information of a current account in the cloud service based on the policy predictive recommendation model, obtaining an authorization policy by screening, and recommending the authorization policy to the current account.

17 Claims, 8 Drawing Sheets

(56) References Cited

U.S. PATENT DOCUMENTS

| | | | | |
|---|---|---|---|---|
| 10,152,544 | B1* | 12/2018 | Friggeri | G06F 16/9535 |
| 2013/0086099 | A1 | 4/2013 | Rolia et al. | |
| 2013/0332361 | A1* | 12/2013 | Ciurea | G06Q 20/405 |
| | | | | 705/44 |
| 2015/0106498 | A1* | 4/2015 | Gulley | G06F 9/5027 |
| | | | | 709/223 |
| 2015/0135258 | A1 | 5/2015 | Smith et al. | |
| 2015/0227936 | A1* | 8/2015 | Bruesewitz | G06Q 20/04 |
| | | | | 705/44 |
| 2016/0110649 | A1 | 4/2016 | Dong et al. | |
| 2016/0180093 | A1 | 6/2016 | Goss et al. | |

FOREIGN PATENT DOCUMENTS

| | | |
|---|---|---|
| CN | 104883376 A | 9/2015 |
| CN | 105074720 A | 11/2015 |
| CN | 105493093 A | 4/2016 |
| CN | 105871854 A | 8/2016 |
| CN | 106131004 A | 11/2016 |
| CN | 106685933 A | 5/2017 |
| JP | 2016066186 A | 4/2016 |
| WO | 2005004026 A1 | 1/2005 |

OTHER PUBLICATIONS

The State Intellectual Property Office of the People's Republic of China (SIPO) Office Action 1 for 201611124782.5 dated Dec. 3, 2019 10 Pages (including translation).

Ping Liu, "Design and Application of Access Control Frame Based on History Characteristic", Chinese Master's Theses Full-text Database—Information Science and Technology, vol. 7, Jul. 15, 2010, pp. 7-46 Total 57 Pages.

* cited by examiner

US 10,686,843 B2

AUTHORIZATION POLICY RECOMMENDATION METHOD AND APPARATUS, SERVER, AND STORAGE MEDIUM

RELATED APPLICATION

This application claims priority of PCT Application No. PCT/CN2017/114290, filed on Dec. 1, 2017, which claims priority of Chinese Patent Application No. 201611124782.5 filed on Dec. 8, 2016, and claims priority to the Chinese Patent Application. The two applications are incorporated herein by reference in their entirety in this application.

FIELD OF THE TECHNOLOGY

The present disclosure relates to the field of computer technologies, and in particular, to an authorization policy recommendation method, an authorization policy recommendation apparatus, a server, and a storage medium.

BACKGROUND OF THE DISCLOSURE

Cloud service provides Internet based services, and provides dynamic and easily extended virtual resources. A service provider using a cloud service may grant a right to a user to help the service provider to securely control the right of access to a resource of the service provide by the user. The access right specifically includes users that may access a resource, a resource that may be accessed by the users, an access manner, and the like. In this way, a server of the cloud service may determine, according to the granted right, whether to allow a user to access a particular resource. The user can access the particular resource of the service provider only when authentication succeeds.

However, often a prediction policy is created according to the past experience of an operator of a cloud service provider, and cannot really reflect a user requirement, and a recommendation method is excessively monotonous and recommendation accuracy is affected.

SUMMARY

A technical problem resolved in the embodiments of the present disclosure is to provide an authorization policy recommendation method, an authorization policy recommendation apparatus, a server, and a storage medium, which can improve diversity of recommendation methods and recommendation accuracy.

To resolve the foregoing technical problem, technical solutions in the embodiments of the present disclosure may be implemented as follows:

An embodiment of the present disclosure provides an authorization policy recommendation method. The method includes obtaining account data based on a cloud service, provided authorization policy data, and service data; and extracting an account feature, an authorization policy feature, and a service feature according to the account data, the provided authorization policy data, and the service data. The method further includes generating a combined feature based on the account data, the provided authorization policy data, and the service data; performing model training according to the account feature, the authorization policy feature, the service feature, and the combined feature, to generate a policy predictive recommendation model; and performing predictive recommendation according to context scenario information of a current account in the cloud service based on the policy predictive recommendation model, obtaining an authorization policy by screening, and recommending the authorization policy to the current account.

An authorization policy recommendation method, the method being executed by a server, the server comprising one or more first processors, a first storage medium, and one or more programs, the one or more programs being stored in the first storage medium, the program comprising one or more units each of which corresponds to a set of instructions, the one or more first processors being configured to execute the instructions. The method includes obtaining account data based on a cloud service, provided authorization policy data, and service data and extracting an account feature, an authorization policy feature, and a service feature according to the account data, the provided authorization policy data, and the service data. The method further includes generating a combined feature according to a relationship among the account data, the provided authorization policy data, and the service data; performing model training according to the account feature, the authorization policy feature, the service feature, and the combined feature, to generate a policy predictive recommendation model; and performing predictive recommendation according to context scenario information of a current account in the cloud service based on the policy predictive recommendation model, obtaining an authorization policy by screening, and recommending the authorization policy to the current account.

Another aspect of the present disclosure provides an authorization policy recommendation apparatus. The apparatus includes a data obtaining component, configured to obtain account data based on a cloud service, provided authorization policy data, and service data; and a feature extraction component, configured to extract an account feature, an authorization policy feature, and a service feature according to the account data, the provided authorization policy data, and the service data; and generate a combined feature according to a relationship among the account data, the provided authorization policy data, and the service data. Further, the apparatus includes a model training and generation component, configured to perform model training according to the account feature, the authorization policy feature, the service feature, and the combined feature, to generate a policy predictive recommendation model; and a predictive recommendation component, configured to perform predictive recommendation according to context scenario information of a current account in the cloud service based on the policy predictive recommendation model, obtain an authorization policy by screening, and recommend the authorization policy to the current account.

In implementation of the embodiments of the present disclosure, the account data based on the cloud service, the provided authorization policy data, and the service data are obtained. The account feature, the authorization policy feature, the service feature, and the combined feature of the account feature, the authorization policy feature, and the service feature are extracted. The policy predictive recommendation model is generated according to the features, finally, predictive recommendation is performed according to the context scenario information of the current account in the cloud service based on the policy predictive recommendation model, and a to-be-recommended authorization policy is obtained by screening. Embodiments of the present disclosure resolve the problems associated with the scenario in which a prediction policy is created according to history experience of an operation person of a cloud service provider, and cannot really reflect a user requirement, and a recommendation method is excessively monotonous and recommendation accuracy is affected. In addition, in embodiments of the present disclosure, different policies are recommended according to the account feature, recommendation precision and diversity are greatly improved, and a policy is used more widely. Further, operation data is accumulated continuously and history actions fed back by a user may be collected. Therefore, data becomes more abundant, and predictive recommendation can be constantly improved and optimized, so that a recommended authorization policy may be continuously optimized. Moreover, predictive recommendation may be performed with reference to the context scenario information of the current account in the cloud service, and the user can be further guided to continuously improve the authorization policy. Therefore, in embodiments of the present disclosure, operation costs may be effectively reduced, and use of authentication systems can be promoted more efficiently.

BRIEF DESCRIPTION OF THE DRAWINGS

To describe the technical solutions in the embodiments of the present disclosure or in the existing technologies more clearly, the following briefly describes the accompanying drawings required for describing the embodiments or the existing technologies. It is apparent that the accompanying drawings in the following description show merely some embodiments of the present disclosure, and a person of ordinary skill in the art may still derive other drawings from these accompanying drawings without creative efforts.

FIG. 4-1 is a diagram of a sample training principle according to an embodiment of the present disclosure;

FIG. 4-2 is a flowchart of an authorization policy recommendation method according to another embodiment of the present disclosure;

DESCRIPTION OF EMBODIMENTS

The following clearly and completely describes the technical solutions in the embodiments of the present disclosure with reference to the accompanying drawings in the embodiments of the present disclosure. Apparently, the described embodiments are merely some but not all of the embodiments of the present disclosure. All other embodiments derived by a person of ordinary skill from the embodiments of the present disclosure without creative efforts shall fall within the protection scope of the present disclosure.

Figure 1:
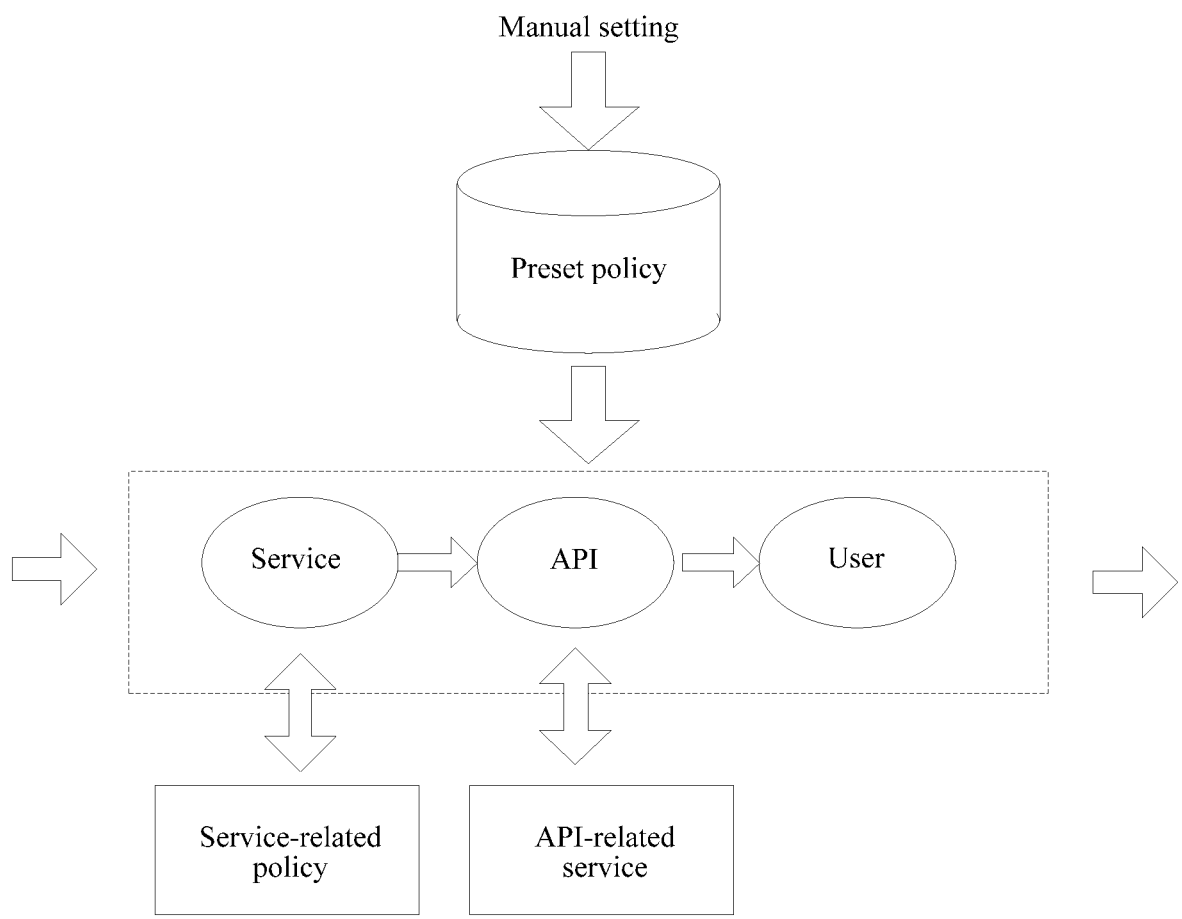
FIG. 1 is a diagram of an authorization policy recommendation principle in the related art.

An authentication service provider often provides several embedded policies (that is, an embedded policy set) according to past experience, and guides a user to select an embedded policy set of different application programming interfaces (Application Programming Interface, API) of each service by using a template. The embedded policy set may be sorted alphabetically. Alternatively, the authentication service provider provides policy weights, and the embedded policy set is sorted according to weight factors. FIG. 1 is a diagram of an authorization policy recommendation principle. A service provider uses preset policies as a recommendation candidate set, and uses a recommendation scenario as a guide template. Recommended content is sorted according to the alphabetical order of the entire set or sorted according to weight factors defined manually, to recommend the content to a user.

Figure 2:
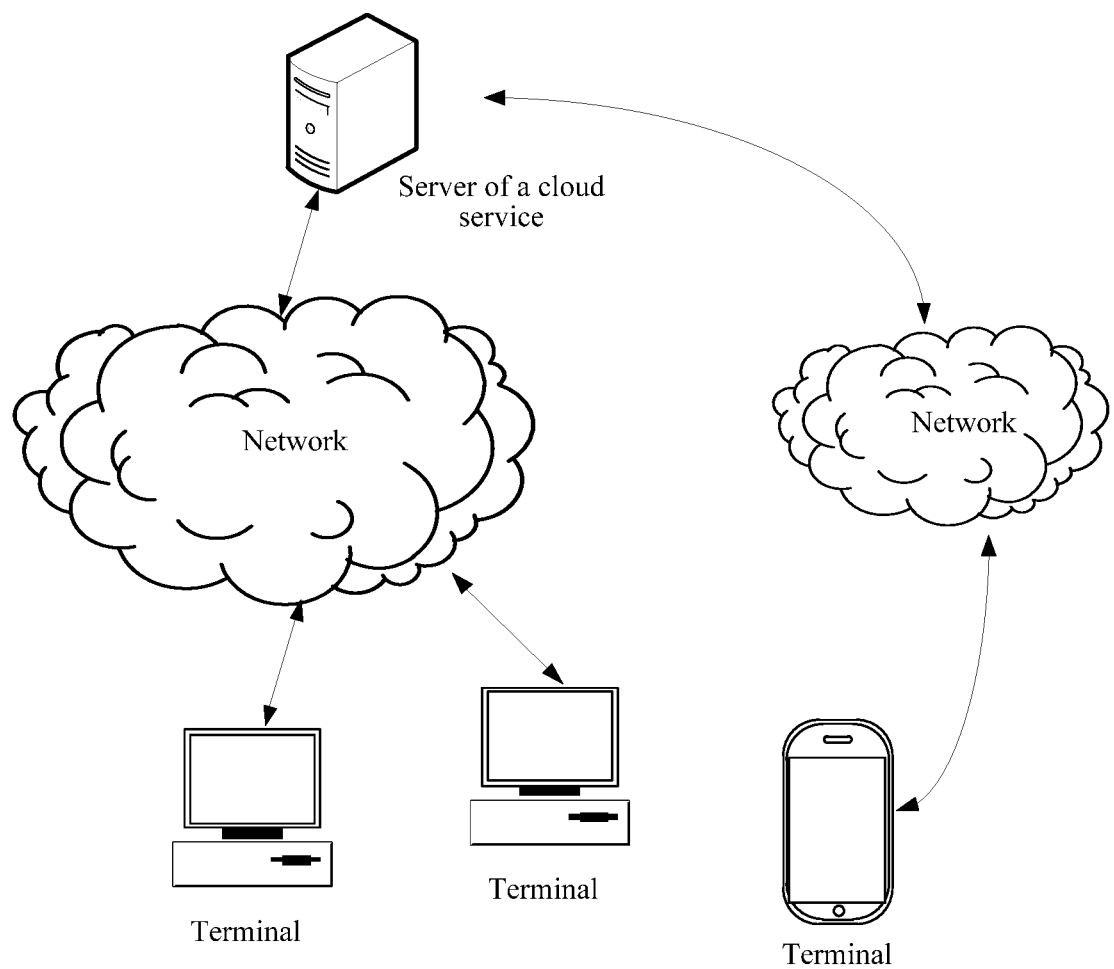
FIG. 2 is an architectural diagram of an authorization policy recommendation scenario according to an embodiment of the present disclosure.

To better understand an authorization policy recommendation method and a related apparatus disclosed in the embodiments of the present disclosure, the following first describes an architecture of a scenario applied to the embodiments of the present disclosure. Referring to FIG. 2, FIG. 2 is an architectural diagram of an authorization policy recommendation scenario according to an embodiment of the present disclosure. As shown in FIG. 2, for example, a cloud service subscriber (for example, an enterprise or an organization) may register, by using a terminal, a cloud service account with a server providing a cloud service, and apply for machine resources for access by a number of users (for example, corresponding employees of the enterprise or the organization). The subscriber may set an authorization policy step by step according to an authorization policy guide provided or recommended by a system, to indicate the users allowed to access a machine resource, machine resources that can be accessed, an access manner, and the like. An embodiment of the present disclosure provides an authorization policy recommendation method, so that a proper authorization policy can be automatically recommended to the user.

Figure 3:
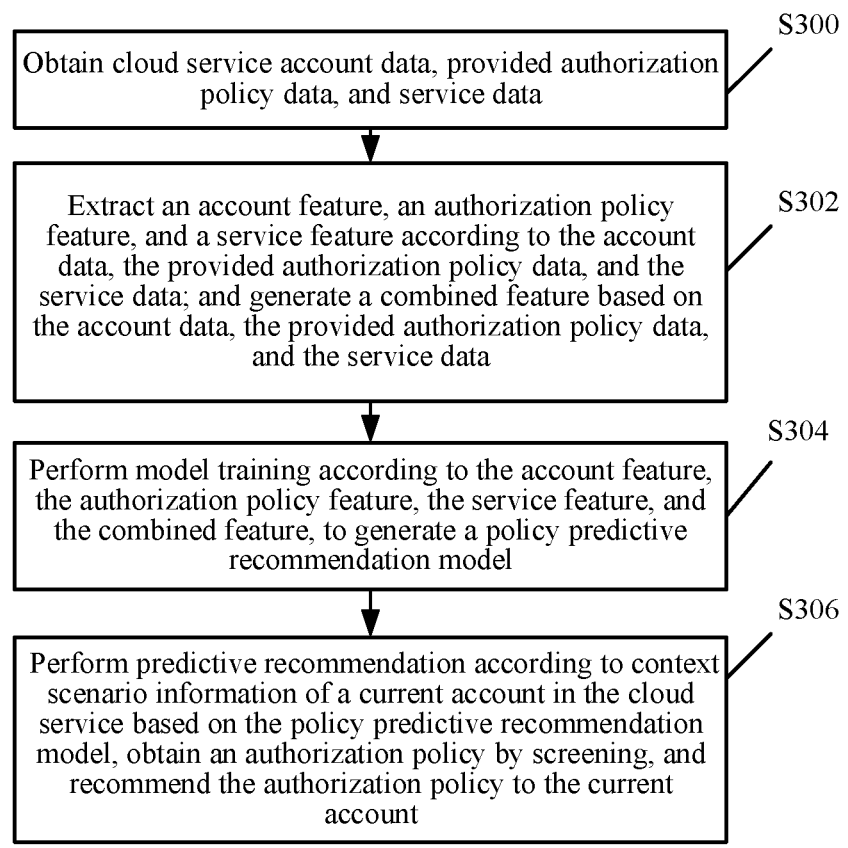
FIG. 3 is a flowchart of an authorization policy recommendation method according to an embodiment of the present disclosure.

Based on the application scenario shown in FIG. 2, referring to FIG. 3, FIG. 3 is a flowchart of an authorization policy recommendation method according to an embodiment of the present disclosure. The method may include the following steps.

Step S300: Obtain account data based on a cloud service, provided authorization policy data, and service data.

In one embodiment of the present disclosure, the account data based on the cloud service in this embodiment of the present disclosure may include information data of a recommended object, for example, personal attribute data of a user, including data such as an account type, an account field (the Internet, the finance, the home appliances, or the like), a login time, a quantity of account login times, and a region. The authorization policy data provided according to the cloud service may include one or more preset policies manually operated by a cloud service provider, and one or more self-defined user policies of an account with authentication authority. Policy content includes information such as an authorized user, an API, and a resource that can be operated. The service data based on the cloud service may include attribute data of each cloud service, and data obtained in continuous operations, including information such as an API list included in a service, and a quantity of users using a service.

It may be understood that after inventory authorization policies in an authentication system of a cloud product are operated for a particular time, a few self-defined policies are generated in a cloud service account, and a cloud service provider also sets a few preset policies. A cloud service system in this embodiment of the present disclosure may obtain, from a database of the cloud service system, or request to obtain account data, authorization policy data, and service data of other cloud services.

Step S302: Correspondingly extract an account feature, an authorization policy feature, and a service feature according to the account data, the provided authorization policy data, and the service data; and generate a combined feature according to a relationship among the account data, the provided authorization policy data, and the service data.

In one embodiment of the present disclosure, this embodiment of the present disclosure may be classified into two features including a basic feature and a combined feature. The basic feature may include the account feature, the authorization policy feature, and the service feature correspondingly extracted from the account data, the provided authorization policy data, and the service data. The combined feature may include a combined feature generated according to the relationship among the account data, the provided authorization policy data, and the service data.

The account feature in this embodiment of the present disclosure may include various types of account information such as an account field, an account creation time, a quantity of login times, a login time length, a latest login time, a registration region, a quantity of sub accounts, and characters. This is not limited in this embodiment of the present disclosure.

The authorization policy feature in this embodiment of the present disclosure may include an API list of an authorization policy, a quantity of authorized users, a quantity of resources, a quantity of users using an authorization policy, an authorization policy use frequency, an authorization policy creation time, a quantity of similar policies, and the like. This is not limited in this embodiment of the present disclosure.

The service feature in this embodiment of the present disclosure may include a quantity of APIs and a quantity of API combinations of a cloud service, a cloud service, a quantity of users using the APIs and the API combinations, a distribution status (a region and a time) of each type of users, and the like. This is not limited in this embodiment of the present disclosure.

The combined feature in this embodiment of the present disclosure may include a user policy combined feature, a user service combined feature, a service policy combined feature, and the like. This is not limited in this embodiment of the present disclosure. The user policy combined feature may include a quantity of policies possessed by a user, user policy distribution, distribution of APIs authorized to a user, a current policy use frequency of a user, an authentication success rate, and the like. The user service combined feature may include a quantity and a list of cloud services possessed by a user, a quantity and a use frequency of cloud service resources of a user, and the like. The service policy combined feature may include a quantity of policies of services, a quantity of policies of APIs, and the like.

Step S304: Perform model training according to the account feature, the authorization policy feature, the service feature, and the combined feature, to generate a policy predictive recommendation model.

In one embodiment of the present disclosure, model training in this embodiment of the present disclosure may include computing frameworks for the cloud service, and training is performed by using the account feature, the authorization policy feature, the service feature, and the combined feature, to optimize parameters in the computing frameworks, to obtain the policy predictive recommendation model.

Figures 1, 4:
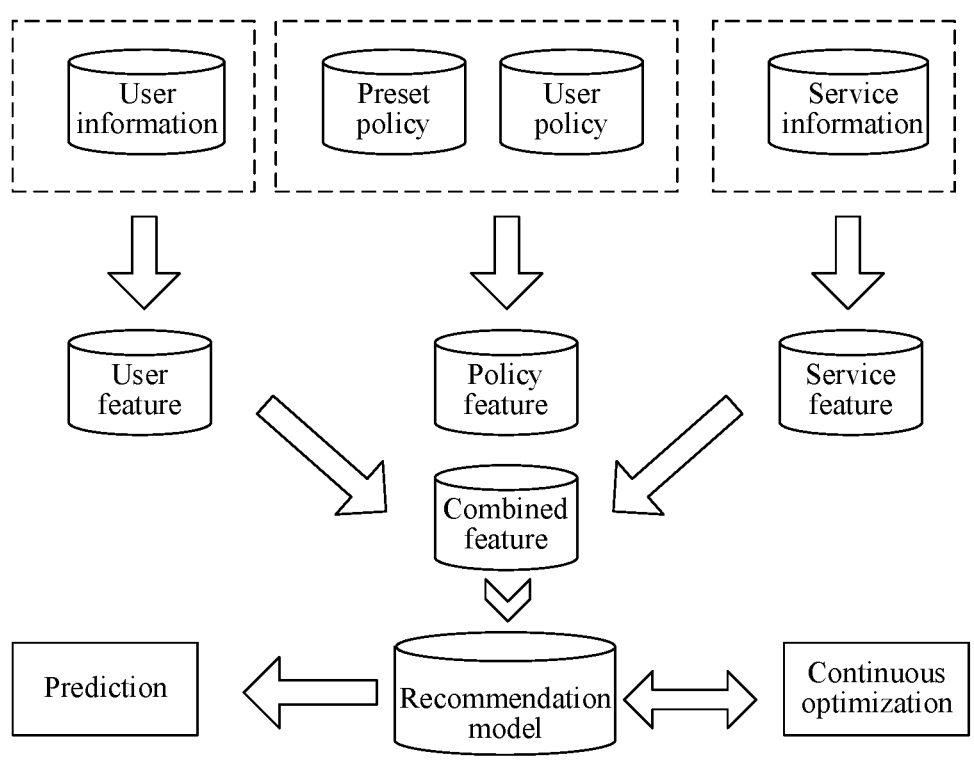
Figures 2, 4:
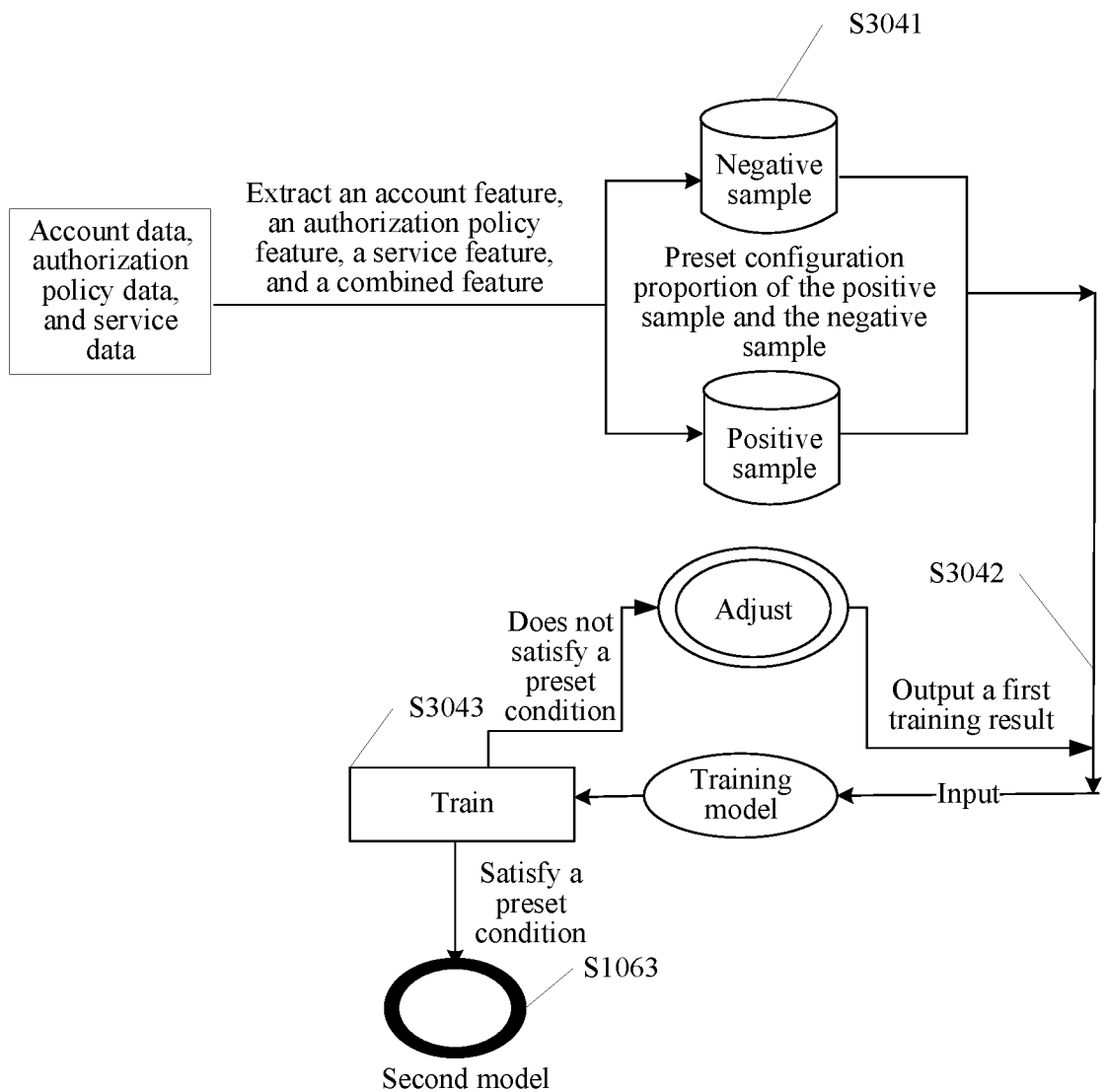

In one embodiment of the present disclosure, FIG. 4-1 is a diagram of a sample training principle according to an embodiment of the present disclosure. A positive sample and a negative sample may be obtained by screening according to the account feature, the authorization policy feature, the service feature, and the combined feature. Then, model training is performed according to the positive sample and the negative sample by using a preset machine learning algorithm, to generate the policy predictive recommendation model. A machine learning algorithm is a mathematical model that generates predictions by finding patterns in the data. Machine learning algorithms may include binary classification, multiclass classification and regression. At a sample selection stage, the positive sample and the negative sample are selected with reference to an association among a user (that is, an account), a policy, and a service, and a history action of the user. Then, model training is performed according to features of the positive sample and the negative sample, to generate the policy predictive recommendation model.

It should be noted that in this embodiment of the present disclosure, a sample constructed according to an existing relationship among a user, a policy, and a service may be defined as the positive sample, a sample manually constructed for a type of user, a policy, and a service type that are never associated may be defined as the negative sample, and a user, a policy, and a service that are associated previously and are dissociated later may also be defined as the negative sample.

Step S306: Perform predictive recommendation according to context scenario information of a current account in the cloud service based on the policy predictive recommendation model, obtain an authorization policy by screening, and recommend the authorization policy to the current account.

In one embodiment of the present disclosure, the context scenario information in this embodiment of the present disclosure may include interface information of a console of the current account in the cloud service or stage information of the current account in an authorization policy setup wizard. Because the setup wizard provides a recommendation step by step and stage by stage according to a service and an API, a policy set is different at each stage. An authorization policy which has a matching degree reaching a first preset threshold may be obtained by screening from a policy candidate set according to the interface information of the console of the current account in the cloud service or the stage information of the current account in the authorization policy setup wizard.

It should be noted that the first preset threshold in this embodiment of the present disclosure may be set by a technical person, a developer, or a user according to a requirement, or set according to experience or experiment data. This is not limited in the present disclosure. Herein, a larger first preset threshold represents that the authorization policy obtained by screening is more accurate. Therefore, a larger first preset threshold may be set in this embodiment of the present disclosure. For example, the first preset threshold may be 98%.

In implementation of this embodiment of the present disclosure, the account data based on the cloud service, the provided authorization policy data, and the service data are obtained, the account feature, the authorization policy feature, the service feature, and the combined feature of the account feature, the authorization policy feature, and the service feature are correspondingly extracted, the policy predictive recommendation model is generated according to the features, finally, predictive recommendation is performed according to the context scenario information of the current account in the cloud service based on the policy predictive recommendation model, and a to-be-recommended authorization policy is obtained by screening. This resolves the prior-art technical problem that a prediction policy is created according to history experience of an operation person of a cloud service provider, and cannot really reflect a user requirement, and a recommendation method is excessively monotonous and recommendation accuracy is affected. In addition, different policies are recommended according to the account feature, recommendation precision and diversity are greatly improved, and a policy is used more widely.

According to the descriptions in the foregoing embodiments, the embodiments of the present disclosure provide a policy predictive recommendation model that is formed according to an introduced machine learning technology, all feature dimensions are considered for each click classification, and determining is performed comprehensively. At an early stage of forming the policy predictive recommendation model, features in as many dimensions as possible still need to be manually selected for training by a machine learning model, and features for description are determined and selected according to a degree at which a training result is distinguished by using a feature. Herein, a problem that a parameter is selected with manual interference basically does not exist, and a proper parameter may be obtained by learning in machine learning. Because definition of a feature is more intuitive compared with that of a parameter having no meaning, explanation can be understood more easily with reference to distribution of features. First, according to the account data, the authorization policy data, and the service data of a machine learning model, policy predictive recommendation relates to comprehensive consideration of features in multiple dimensions, thereby improving policy predictive recommendation accuracy. In addition, because the model has a function of evolving learning, although the account data, the authorization policy data, and the service data are updated or deleted, model training is simply performed again (sometimes, the features need to be slightly adjusted), to recognize updated account data, updated authorization policy data, and updated service data and adjust the policy predictive recommendation model, thereby ensuring authorization policy recommendation accuracy.

Application of a machine learning technology to prediction of a click-through rate can be freely shared and disseminated, because predictive recommendation of a machine learning policy is comprehensive and may be self-evolving, and does not target particular data. Therefore, the practice of policy predictive recommendation based on a machine learning model can also be disclosed for different data of a same apparatus.

FIG. 4-2 is a flowchart of an authorization policy recommendation method according to an embodiment of the present disclosure. An implementation process of step S304 of the method may include: step S3041 to step S3043 as follows:

Step S3041: Obtain a positive sample and a negative sample from the history account data, the authorization policy data, and the service data according to a preset configuration proportion, where the positive sample and the negative sample are used to represent a correspondence between an authorization policy and a matching degree.

Herein, in an actual operation process, there is a proportion between a high matching degree and a low matching degree, and the proportion is the configuration proportion. When the policy predictive recommendation model is formed, a terminal also needs to set a configuration of training data (an existing history account feature, authorization policy feature, service feature, and combined feature, and a corresponding matching degree) according to the configuration proportion.

Herein, the terminal needs to extract a feature of the positive sample and a feature of the negative sample. In this embodiment of the present disclosure, the features of the positive sample and the negative sample are extracted to obtain the account feature, the authorization policy feature, the service feature, and the combined feature, and the features are used to perform model training.

It may be understood that in this embodiment of the present disclosure, more complete data related to the positive sample and the negative sample indicates a more accurate matching degree of subsequent policy predictive recommendation.

Step S3042. Invoke a specified training model to process the positive sample or the negative sample, to obtain a first training result.

Step S3043. Continuously monitor the training model, until a first training result satisfies a model training condition, and use a first training model that causes the first training result to satisfy the model training condition as the policy predictive recommendation model, where the model training condition is used to represent that when a data output result obtained according to the first training model is applied to determine a matching degree, the matching degree is most close to an actual matching degree.

In this embodiment of the present disclosure, regardless of a training model used, when training starts, input of the training model includes features in the foregoing different dimensions. If a feature has no beneficial effect on a training result or is incorrectly classified after multiple tests, a weight of the feature may be reduced in real time. If the feature has a beneficial effect on the training result, the weight of the feature may be increased in real time. If a weight of a parameter may be reduced to 0, the feature has no effect in the training model. After a final test in this embodiment of the present disclosure, a long-term feature of the features in the foregoing different dimensions finally can have a positive effect on the training result. Assuming that the features in the different dimensions include only the long-term feature (that is, other improper features have all been removed) below, a forming process of the foregoing prediction model of a click-through rate approximately includes: inputting a feature of the positive sample or the negative sample to the first training model; obtaining the first training result from the first model, where the constructed first model uses one or more features, and each feature has a corresponding weight; continuously monitoring the first training result until the preset condition is satisfied; and using the first model as the policy predictive recommendation model.

Optionally, the preset condition in this embodiment of the present disclosure may be that accuracy of a matching degree reaches the first preset threshold. The first preset threshold may be 90%, and determining of the first preset threshold may be set. This is not limited in this embodiment of the present disclosure. However, as a higher first preset threshold is set, the policy predictive recommendation model reaching the first preset threshold or the preset condition is more precise.

As can be learned from the foregoing procedure: 1) in this embodiment of the present disclosure, a matching degree is estimated according to the policy predictive recommendation model, when a matching degree of an authorization policy is estimated according to a current user action by using the account feature, the authorization policy feature, the service feature, and the combined feature, the account data, the authorization policy data, and the service data are fully used, the policy predictive recommendation model is obtained with reference to history data that is from multiple channels, an indicator that reflects credibility of the authorization policy can be effectively obtained, and the authorization policy is estimated; 2) in this embodiment of the present disclosure, features in various different dimensions are introduced to train the training model, and a finally verified feature is determined according to the training result, thereby improving authorization policy recommendation accuracy; and 3) in this embodiment of the present disclosure, an obvious feature of the policy predictive recommendation model is that the model may be self-evolving, a weight of a feature is automatically adjusted according to a change of a user click action, and it is avoided that parameter adjustment is frequently interfered manually according to a rule.

It may be understood that in this embodiment of the present disclosure, compared with the existing technology of using various complex action data, in the present disclosure, the existing account data, authorization policy data, and service data are used as a main data source. A feature construction process is simple and easy, and a feature does not need to be constructed and processed in a complex manner by using various complex coding, aggregation, and screening means. This greatly reduces data processing workload, and the policy predictive recommendation model is simply available.

Figure 5:
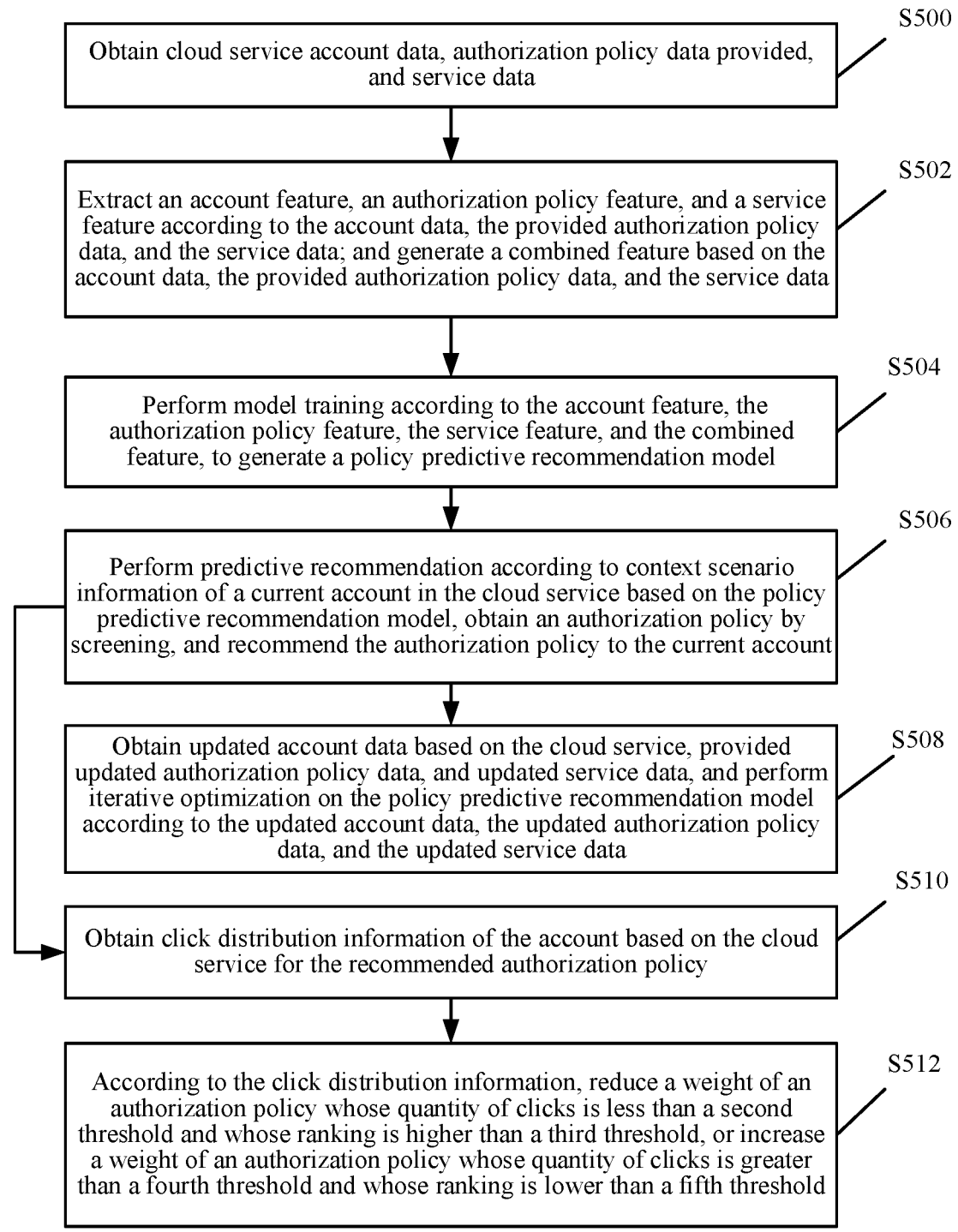
FIG. 5 is a flowchart of another embodiment of an authorization policy recommendation method according to another embodiment of the present disclosure.

In one embodiment of the present disclosure, FIG. 5 is a flowchart of another embodiment of an authorization policy recommendation method according to the present disclosure. The method may include the following steps:

Step S500: Obtain account data based on a cloud service, provided authorization policy data, and service data.

Step S502: Correspondingly extract an account feature, an authorization policy feature, and a service feature according to the account data, the provided authorization policy data, and the service data; and generate a combined feature according to a relationship among the account data, the provided authorization policy data, and the service data.

Step S504: Perform model training according to the account feature, the authorization policy feature, the service feature, and the combined feature, to generate a policy predictive recommendation model.

Step S506: Perform predictive recommendation according to context scenario information of a current account in the cloud service based on the policy predictive recommendation model, obtain an authorization policy by screening, and recommend the authorization policy to the current account.

In one embodiment of the present disclosure, step S500 to step S506 may correspond to step S300 to step S306 in the embodiment shown in FIG. 3, and details are no longer described herein.

Step S508: Obtain updated account data based on the cloud service, provided updated authorization policy data, and updated service data, and perform iterative optimization on the policy predictive recommendation model according to the updated account data, the update authorization policy data, and the updated service data.

In one embodiment of the present disclosure, a cloud service system may constantly update basic data such as the account data based on the cloud service, the provided authorization policy data, and the service data, the positive sample, and the negative sample, to obtain the updated account data based on the cloud service, the provided updated authorization policy data, and the updated service data, and the updated positive sample and negative sample. Then, the account feature, the authorization policy feature, and the service feature are extracted again, the combined feature is generated again, and iterative optimization is performed on the policy predictive recommendation model according to the updated data. Therefore, predictive recommendation is constantly improved and optimized, and a recommended authorization policy is continuously optimized.

Step S510: Obtain click distribution information of the account based on the cloud service for the recommended authorization policy.

In one embodiment of the present disclosure, the cloud service system may further constantly obtain click distribution information of the account for the recommended authorization policy, that is, history action information of the user for the recommended authorization policy, for example, an authorization policy frequently used by a cloud service subscriber, some services frequently accessed by a user of the subscriber, and a subsequent authentication success rate for a specified authorization policy.

Step S512: According to the click distribution information, reduce a weight of an authorization policy which has a quantity of clicks less than a second preset threshold and which has a ranking higher than a third preset threshold, or increase a weight of an authorization policy which has a quantity of clicks greater than a fourth preset threshold and which has a ranking lower than a fifth preset threshold.

In one embodiment of the present disclosure, the authorization policy obtained by screening in step S506 in this embodiment of the present disclosure may include multiple authorization policies. The recommending the authorization policy to the current account may include: when the multiple authorization policies are obtained by prediction, recommending the multiple authorization policies ranked according to weights to the current account. In this embodiment of the present disclosure, the cloud service system may reduce a weight of an authorization policy that is ranked in the front (that is, a ranking is greater than the third preset threshold) but has a small quantity of user clicks (that is, the quantity of clicks is less than the second preset threshold), to adjust backwards the ranking of the authorization policy according to the click distribution information by using a click-through-rate (CTR) estimation model similar to a search engine. A weight of an authorization policy that is ranked in the back (that is, a ranking is less than the fifth preset threshold) but has a large quantity of user clicks (that is, the quantity of clicks is greater than the fourth preset threshold) is increased, to adjust forwards the ranking of the authorization policy. Therefore, predictive recommendation can be constantly improved and optimized, so that a recommended authorization policy is continuously optimized, and an authorization policy that better suits a current user is recommended.

In implementation of the embodiments of the present disclosure, the account data based on the cloud service, the provided authorization policy data, and the service data are obtained, the account feature, the authorization policy feature, the service feature, and the combined feature of the account feature, the authorization policy feature, and the service feature are correspondingly extracted, the policy predictive recommendation model is generated according to the features, finally, predictive recommendation is performed according to the context scenario information of the current account in the cloud service based on the policy predictive recommendation model, a to-be-recommended authorization policy is obtained by screening. This resolves the prior-art technical problem that a prediction policy is created according to history experience of an operation person of a cloud service provider, and cannot really reflect a user requirement, and a recommendation method is excessively monotonous and recommendation accuracy is affected. In addition, different policies are recommended according to the account feature, recommendation precision and diversity are greatly improved, and a policy is used more widely. Further, operation data is accumulated continuously and history actions fed back by a user are collected. Therefore, data becomes more abundant, and predictive recommendation can be constantly improved and optimized, so that a recommended authorization policy is continuously optimized. Moreover, predictive recommendation is performed with reference to the context scenario information of the current account in the cloud service, and the user can be further guided to continuously improve the authorization policy. Therefore, operation costs are effectively reduced, and use of authentication systems can be promoted more efficiently.

In one embodiment of the present disclosure, the authorization policy recommendation methods provided in all the embodiments are executed by a server, the server includes one or more first processors, a first storage medium, and one or more programs, the one or more programs are stored in the first storage medium. The program includes one or more units each of which corresponds to a set of computer instructions, and the one or more first processors are configured to execute the computer instructions. A detailed implementation process in which the server executes the authorization policy recommendation method is consistent with that described in all the foregoing embodiments.

To better conveniently implement the foregoing solutions of the embodiments of the present disclosure, the present disclosure further correspondingly provides an authorization policy recommendation apparatus. The following provides detailed descriptions with reference to accompanying drawings.

Figure 6:
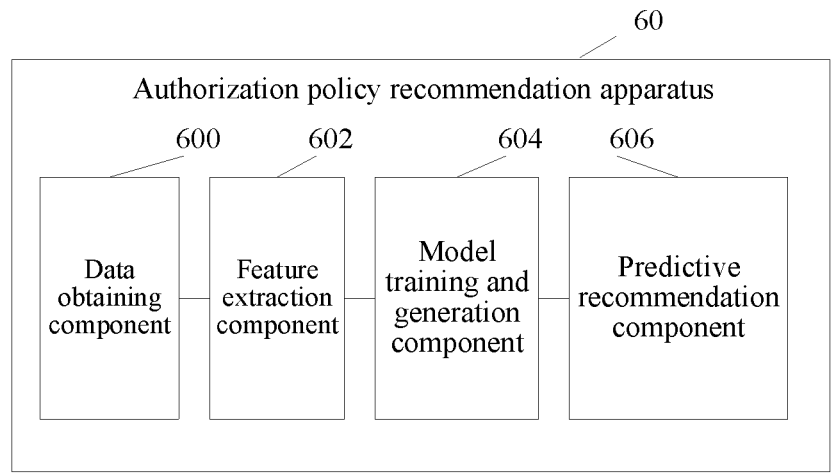
FIG. 6 is a structural diagram of an authorization policy recommendation apparatus according to an embodiment of the present disclosure.

FIG. 6 is a structural diagram of an authorization policy recommendation apparatus according to an embodiment of the present disclosure. An authorization policy recommendation apparatus 60 may include: a data obtaining component 600, a feature extraction component 602, a model training and generation component 604, and a predictive recommendation component 606, where the data obtaining component 600 is configured to obtain account data based on a cloud service, provided authorization policy data, and service data; the feature extraction component 602 is configured to: correspondingly extract an account feature, an authorization policy feature, and a service feature according to the account data, the provided authorization policy data, and the service data; and generate a combined feature according to a relationship among the account data, the provided authorization policy data, and the service data; the model training and generation component 604 is configured to perform model training according to the account feature, the authorization policy feature, the service feature, and the combined feature, to generate a policy predictive recommendation model; and the predictive recommendation component 606 is configured to: perform predictive recommendation according to context scenario information of a current account in the cloud service based on the policy predictive recommendation model, obtain an authorization policy by screening, and recommend the authorization policy to the current account.

Figure 7:
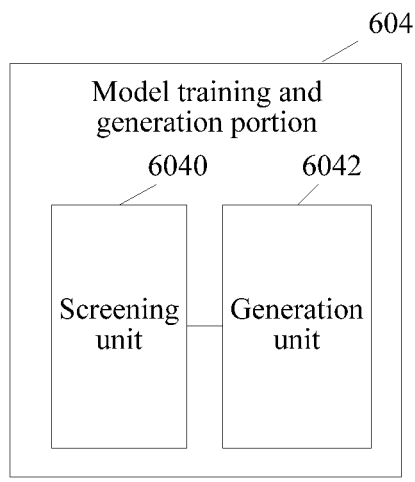
FIG. 7 is a structural diagram of a model training and generation module according to an embodiment of the present disclosure.

In one embodiment of the present disclosure, FIG. 7 is a structural diagram of a model training and generation module according to an embodiment of the present disclosure. The model training and generation component 604 may include a screening unit 6040 and a generation unit 6042, where the screening unit 6040 is configured to obtain a positive sample and a negative sample by screening according to the account feature, the authorization policy feature, the service feature, and the combined feature; and the generation unit 6042 is configured to perform model training according to the positive sample and the negative sample by using a preset machine learning algorithm, to generate the policy predictive recommendation model.

In one embodiment of the present disclosure, the context scenario information in this embodiment of the present disclosure includes interface information of a console of the current account in the cloud service or stage information of the current account in an authorization policy setup wizard.

The predictive recommendation component 606 is specifically configured to: when the context scenario information includes interface information of a console of the current account in the cloud service or stage information of the current account in an authorization policy setup wizard, obtain, by screening, an authorization policy which has a matching degree reaching a first preset threshold from a policy candidate set according to the interface information of the console of the current account in the cloud service or the stage information of the current account in the authorization policy setup wizard; and recommend the authorization policy to the current account.

Figure 8:
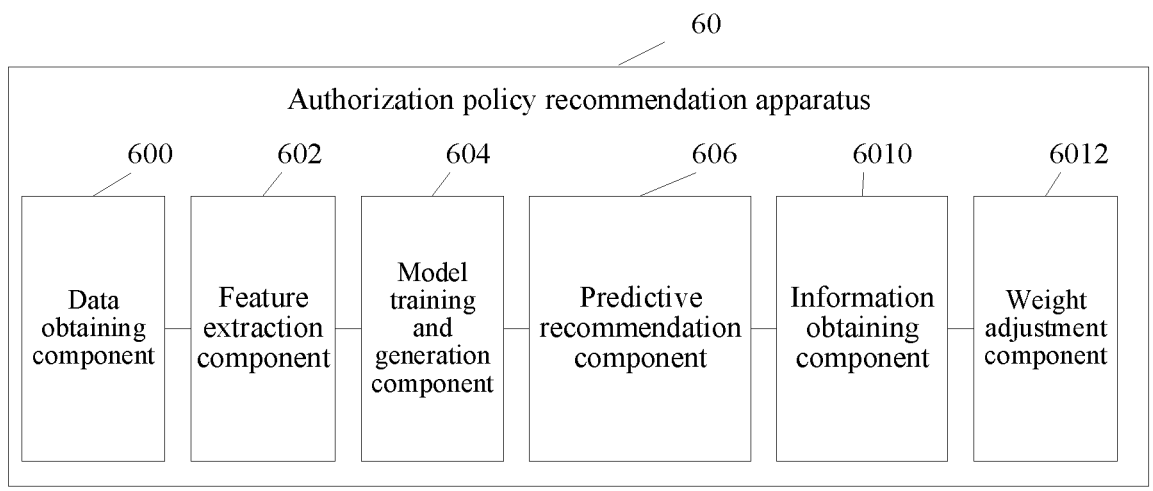
FIG. 8 is a structural diagram 1 of another embodiment of an authorization policy recommendation apparatus according to an embodiment of the present disclosure.

In one embodiment of the present disclosure, FIG. 8 is a structural diagram 1 of another embodiment of an authorization policy recommendation apparatus according to an embodiment of the present disclosure. In addition to the data obtaining component 600, the feature extraction component 602, the model training and generation component 604, and the predictive recommendation component 606, the authorization policy recommendation apparatus 60 may further include: an information obtaining component 6010 and a weight adjustment component 6012.

The data obtaining component 600 is further configured to: after the predictive recommendation component 606 recommends the authorization policy to the current account, obtain updated account data based on the cloud service, provided updated authorization policy data, and updated service data, and perform iterative optimization on the policy predictive recommendation model according to the updated account data, the update authorization policy data, and the updated service data.

In one embodiment of the present disclosure, the predictive recommendation component 606 is specifically configured to: when multiple authorization policies are obtained by prediction, recommend the multiple authorization policies ranked according to weights to the current account.

The information obtaining component 6010 is configured to: after the multiple authorization policies ranked according to a sequence are recommended to the current account, obtain click distribution information of the account based on the cloud service for the recommended authorization policies.

The weight adjustment component 6012 is configured to: according to the click distribution information, reduce a weight of an authorization policy which has a quantity of clicks less than a second preset threshold and which has a ranking higher than a third preset threshold, or increase a weight of an authorization policy which has a quantity of clicks greater than a fourth preset threshold and which has a ranking lower than a fifth preset threshold.

Figure 9:
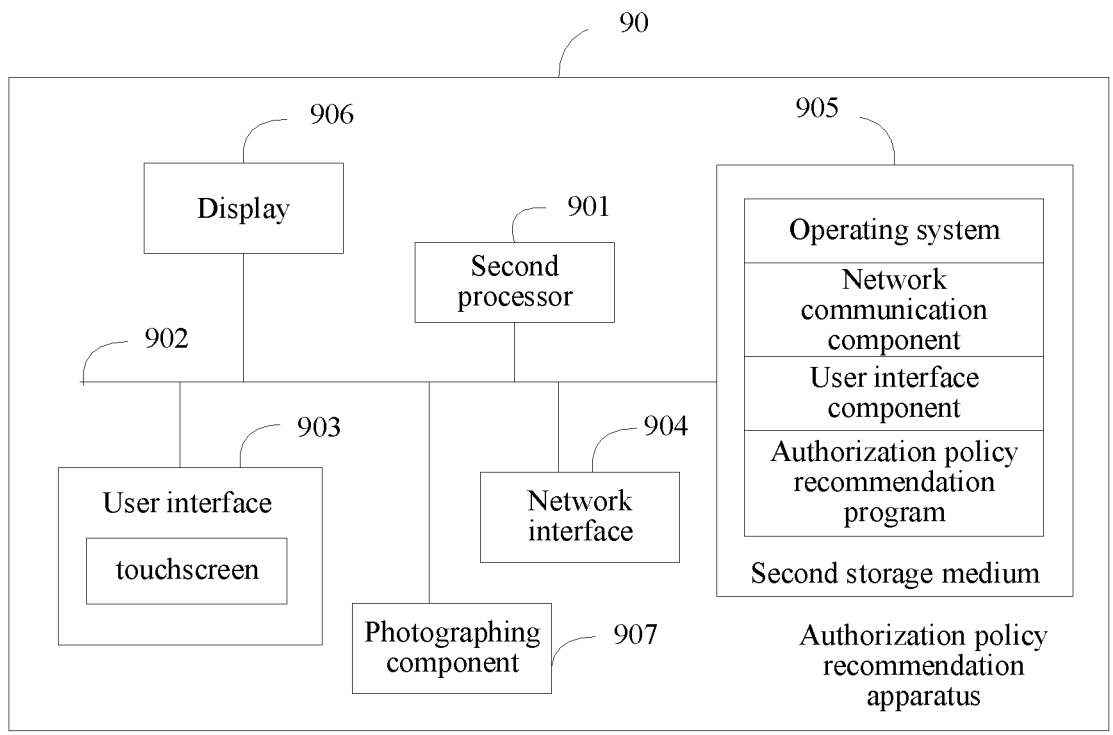
FIG. 9 is structural diagram 2 of another embodiment of an authorization policy recommendation apparatus according to an embodiment of the present disclosure.

Referring to FIG. 9, FIG. 9 is a structural diagram of another embodiment of an authorization policy recommendation apparatus according to the present disclosure. As shown in FIG. 9, the authorization policy recommendation apparatus 90 may include: at least one second processor 901 such as a CPU, at least one network interface 904, a user interface 903, a second storage medium 905, at least one communications bus 902, a display 906, and a photographing component 907. The communications bus 902 is configured to implement connection and communication between the components. The user interface 903 may include a touchscreen and the like. Optionally, the network interface 904 may include a standard wired interface and a standard wireless interface (such as a WiFi interface). The second storage medium 905 may be a high-speed RAM memory, or may be a non-volatile memory (non-volatile memory) such as at least one magnetic disk storage, and the second storage medium 905 includes a flash in this embodiment of the present disclosure. Optionally, the second storage medium 905 may further be at least one storage system that is located far away from the second processor 901. As shown in FIG. 9, the second storage medium 905, which is used as a computer storage medium, may include an operating system, a network communication component, a user interface component, and an authorization policy recommendation program.

In the authorization policy recommendation apparatus 90 shown in FIG. 9, the second processor 901 may be configured to invoke the authorization policy recommendation program stored in the second storage medium 905, and perform the following operations:

Obtaining account data based on a cloud service, provided authorization policy data, and service data by using the network interface 904 or the user interface 903.

Correspondingly extracting an account feature, an authorization policy feature, and a service feature according to the account data, the provided authorization policy data, and the service data; and generating a combined feature according to a relationship among the account data, the provided authorization policy data, and the service data.

Performing model training according to the account feature, the authorization policy feature, the service feature, and the combined feature, to generate a policy predictive recommendation model.

Performing predictive recommendation according to context scenario information of a current account in the cloud service based on the policy predictive recommendation model, obtaining an authorization policy by screening, and recommending the authorization policy to the current account.

In one embodiment of the present disclosure, the performing, by the second processor 901, model training according to the account feature, the authorization policy feature, the service feature, and the combined feature, to generate a policy predictive recommendation model may include: obtaining a positive sample and a negative sample by screening according to the account feature, the authorization policy feature, the service feature, and the combined feature; and performing model training according to the positive sample and the negative sample by using a preset machine learning algorithm, to generate the policy predictive recommendation model.

In one embodiment of the present disclosure, the context scenario information includes interface information of a console of the current account in the cloud service or stage information of the current account in an authorization policy setup wizard. The performing, by the second processor 901, predictive recommendation according to context scenario information of a current account in the cloud service to obtain an authorization policy by screening may include: obtaining, by screening, an authorization policy which has a matching degree reaching a first preset threshold from a policy candidate set according to the interface information of the console of the current account in the cloud service or the stage information of the current account in the authorization policy setup wizard.

In one embodiment of the present disclosure, after recommending the authorization policy to the current account, the second processor 901 may further perform: obtaining updated account data based on the cloud service, provided updated authorization policy data, and updated service data, and performing iterative optimization on the policy predictive recommendation model according to the updated account data, the update authorization policy data, and the updated service data.

In one embodiment of the present disclosure, the recommending, by the second processor 901, the authorization policy to the current account includes: when multiple authorization policies are obtained by prediction, recommending the multiple authorization policies ranked according to weights to the current account; and after recommending the multiple authorization policies ranked according to a sequence to the current account. The second processor 901 may further perform: obtaining click distribution information of the account based on the cloud service for the recommended authorization policies by using the network interface 904 or the user interface 903; and according to the click distribution information, reducing a weight of an authorization policy which has a quantity of clicks less than a second preset threshold and which has a ranking higher than a third preset threshold, or increasing a weight of an authorization policy which has a quantity of clicks greater than a fourth preset threshold and which has a ranking lower than a fifth preset threshold.

It should be noted that in the embodiments of the present disclosure, the authorization policy recommendation apparatus 60 or the authorization policy recommendation apparatus 90 includes, but is not limited to, an electronic device such as a personal computer. The authorization policy recommendation apparatus 60 or the authorization policy recommendation apparatus 90 is generally a server at a cloud service end. It may be understood that for functions of modules of the authorization policy recommendation apparatus 60 or the authorization policy recommendation apparatus 90, correspondingly refer to specific implementations in any embodiment of FIG. 1 to FIG. 5 in the foregoing method embodiments. Details are no longer described herein.

Figure 10:
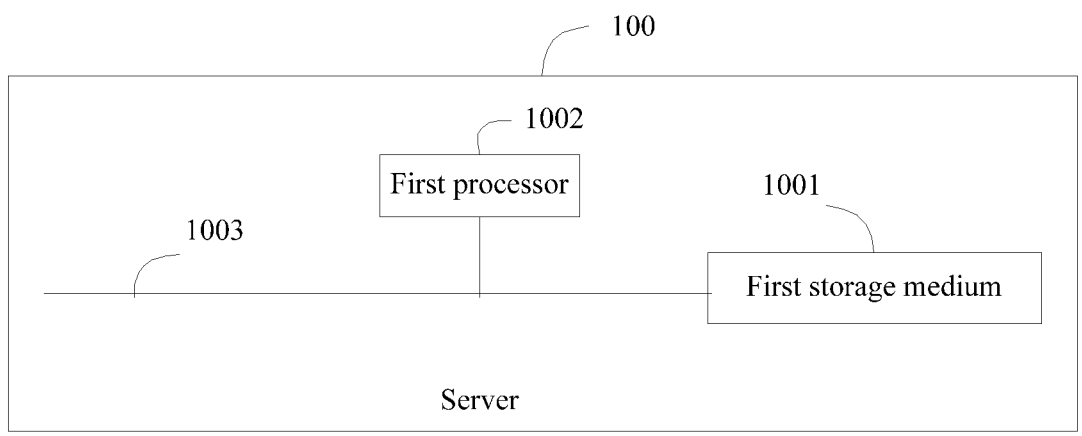
FIG. 10 is a structural diagram of a server according to an embodiment of the present disclosure.

Exemplarily, as shown in FIG. 10, an embodiment of the present disclosure provides a server 100, including: a first storage medium 1001, configured to store an executable instruction; and a first processor 1002, configured to execute the executable instruction stored in the storage medium, the executable instruction being configured to execute the foregoing authorization policy recommendation method.

Certainly, in an actual application, as shown in FIG. 10, components of the server are coupled by using a bus system 1003. It should be understood that the bus system 1003 is configured to implement connection and communication between the components. The bus system 1003 further includes a power supply bus, a control bus, and a status signal bus in addition to a data bus. However, for the purpose of clarity of description, various buses are all marked as a bus system 1003 in FIG. 10.

In implementation of the embodiments of the present disclosure, the account data based on the cloud service, the provided authorization policy data, and the service data are obtained, the account feature, the authorization policy feature, the service feature, and the combined feature of the account feature, the authorization policy feature, and the service feature are separately extracted, the policy predictive recommendation model is generated according to the features, finally, predictive recommendation is performed according to the context scenario information of the current account in the cloud service based on the policy predictive recommendation model, a to-be-recommended authorization policy is obtained by screening. This resolves the technical problem that a prediction policy is created according to history experience of an operation person of a cloud service provider, and cannot really reflect a user requirement, and a recommendation method is excessively monotonous and recommendation accuracy is affected. In addition, different policies are recommended according to the account feature, recommendation precision is greatly improved, and a policy is used more widely. Further, operation data is accumulated continuously in real time and history actions fed back by a user are collected in real time. Therefore, in embodiments of the present disclosure, data becomes more abundant, and predictive recommendation can be constantly improved and optimized, so that a recommended authorization policy is continuously optimized. That is, operation data and other data are received, stored, and analyzed as soon as the data is received by the cloud service terminal or a server. As real time data becomes more abundant, and predictive recommendation can be constantly improved and optimized, so that a recommended authorization policy is continuously optimized in real time by the cloud service system. Moreover, predictive recommendation is performed with reference to the context scenario information of the current account in the cloud service, and the user can be further guided to continuously improve the authorization policy. Therefore, operation costs are effectively reduced, and use of authentication systems can be promoted more efficiently.

It should be noted that an embodiment of the present disclosure may further provide a computer storage medium, applied to a server, and storing a machine instruction. When the machine instruction is executed by one or more first processors, the first processor performs the authorization policy recommendation method corresponding to the server.

An embodiment of the present disclosure may further provide another computer storage medium, applied to an authorization policy recommendation apparatus, and storing a machine instruction. When the machine instruction is executed by one or more second processors, the second processor performs the foregoing authorization policy recommendation method corresponding to the authorization policy recommendation apparatus.

The computer-readable storage medium may be a storage such as a ferromagnetic random access memory (FRAM), a read only memory (ROM), a programmable read-only memory (PROM), an erasable programmable read-only memory (EPROM), an electrically erasable programmable read-only memory (EEPROM), a flash memory (Flash Memory), a magnetic storage, an optic disc, or a compact disc read-only memory (Compact Disc Read-Only Memory, CD-ROM).

The technical solutions provided in the embodiments of the present disclosure may be randomly combined if there is no conflict.

In the several embodiments provided in the present application, it should be understood that the disclosed method and intelligent device may be implemented in other manners. The described device embodiments are merely exemplary. A component, or a unit is merely logical function division and may be other division during actual implementation. A functional component or unit may be implemented by one or more computer programs stored in a computer readable media. When executed by one or more processors, the computer programs implement the functions of the corresponding component or unit. Further, multiple units or components may be combined or integrated into another system, or some features may be ignored or not performed. In addition, the displayed or discussed mutual couplings or direct couplings or communication connections between the components may be implemented through some interfaces, indirect couplings or communication connections between the devices or units, or electrical connections, mechanical connections, or connections in other forms.

The components or units described as separate components may be or may not be physically separated. The component displayed as a unit may be or may not be a physical unit. That is, the units may be located in a same place, or may be distributed to multiple network units. Some or all of the units may be selected according to actual requirements to implement the purpose of the solutions of the embodiments.

In addition, functional components or units in the embodiments of the present disclosure may be all integrated in a second processing unit, each unit is separately used as a unit, or two or more units are integrated in a unit. The integrated unit may be implemented in a form of hardware, or may be implemented in form of hardware plus a software functional unit.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure.

In the embodiments of the present disclosure, an authorization policy recommendation apparatus may recommend different policies according to an account feature. Therefore, recommendation precision and diversity are greatly improved, and a policy is used more widely.

What is claimed is:

1. An authorization policy recommendation method, comprising:
    obtaining, by a server, account data based on a cloud service, provided authorization policy data, and service data;
    extracting, by the server, an account feature, an authorization policy feature, and a service feature according to the account data, the provided authorization policy data, and the service data;
    generating, by the server, a combined feature based on the account data, the provided authorization policy data, and the service data;
    obtaining, by the server, a positive sample and a negative sample based on the account feature, the authorization policy feature, the service feature, and the combined feature;
    performing, by the server, model training according to the positive sample and the negative sample by using a machine learning algorithm, to generate a policy predictive recommendation model; and
    performing, by the server, predictive recommendation according to context scenario information of a current account in the cloud service based on the policy predictive recommendation model, obtaining an authorization policy by screening, and recommending the authorization policy to the current account.

2. The method according to claim 1, wherein the performing predictive recommendation according to context scenario information of a current account in the cloud service, and obtaining an authorization policy by screening comprises:
    when the context scenario information comprises interface information of a console of the current account in the cloud service or stage information of the current account in an authorization policy setup wizard, obtaining, an authorization policy with a matching degree reaching a first threshold from a policy candidate set according to the interface information of the console of the current account in the cloud service or the stage information of the current account in the authorization policy setup wizard.

3. The method according to claim 1, wherein after the recommending the authorization policy to the current account, the method further comprises:
    obtaining updated account data based on the cloud service, updated provided authorization policy data, and updated service data, and performing iterative optimization on the policy predictive recommendation model according to the updated account data, the update authorization policy data, and the updated service data.

4. The method according to claim 1, wherein the recommending the authorization policy to the current account comprises:
    when multiple authorization policies are obtained by prediction, recommending the multiple authorization policies ranked according to weights to the current account.

5. The method according to claim 4, wherein after the recommending the multiple authorization policies ranked according to a sequence to the current account, the method further comprises:
    obtaining click distribution information of the account based on the cloud service for the recommended authorization policies; and
    according to the click distribution information, reducing a weight of an authorization policy with a quantity of clicks being less than a second threshold and with a ranking being higher than a third threshold, or increasing a weight of an authorization policy with a quantity of clicks being greater than a fourth threshold and a ranking being lower than a fifth threshold.

6. The method according to claim 1, wherein the combined feature comprising at least one of:
    a user policy combined feature that includes at least one of a quantity of policies possessed by a user, user policy distribution, distribution of APIs authorized to a user, a current policy use frequency of a user, or an authentication success rate;
    a user service combined feature that includes at least one of a quantity and a list of cloud services possessed by a user, or a quantity and a use frequency of cloud service resources of a user; and
    a service policy combined feature that includes at least one of a quantity of policies of services, or a quantity of policies of APIs.

7. A non-transitory computer-readable storage medium storing computer program instructions executable by at least one processor to perform:
    obtaining account data based on a cloud service, provided authorization policy data, and service data;
    extracting an account feature, an authorization policy feature, and a service feature according to the account data, the provided authorization policy data, and the service data;
    generating a combined feature according to a relationship among the account data, the provided authorization policy data, and the service data;
    obtaining a positive sample and a negative sample based on the account feature, the authorization policy feature, the service feature, and the combined feature;
    performing, by the server, model training according to the positive sample and the negative sample by using a machine learning algorithm, to generate a policy predictive recommendation model; and
    performing predictive recommendation according to context scenario information of a current account in the cloud service based on the policy predictive recommendation model, obtaining an authorization policy by screening, and recommending the authorization policy to the current account.

8. The storage medium according to claim 7, wherein the performing predictive recommendation according to context scenario information of a current account in the cloud service, and obtaining an authorization policy by screening comprises:
    when the context scenario information comprises interface information of a console of the current account in the cloud service or stage information of the current account in an authorization policy setup wizard, obtaining, by screening, an authorization policy with a matching degree reaching a first threshold from a policy candidate set according to the interface information of the console of the current account in the cloud service or the stage information of the current account in the authorization policy setup wizard.

9. The storage medium according to claim 7, wherein after the recommending the authorization policy to the current account, the computer program instructions further cause the at least one processor to perform:
    obtaining updated account data based on the cloud service, provided updated authorization policy data, and updated service data, and performing iterative optimization on the policy predictive recommendation model according to the updated account data, the update authorization policy data, and the updated service data.

10. The storage medium according to claim 7, wherein the recommending the authorization policy to the current account comprises:
    when multiple authorization policies are obtained by prediction, recommending the multiple authorization policies ranked according to weights to the current account.

11. The storage medium according to claim 10, wherein after the recommending the multiple authorization policies ranked according to a sequence to the current account, the method further comprises:
    obtaining click distribution information of the account based on the cloud service for the recommended authorization policies; and
    according to the click distribution information, reducing a weight of an authorization policy with a quantity of clicks being less than a second threshold and with a ranking being higher than a third threshold, or increasing a weight of an authorization policy with a quantity of clicks being greater than a fourth threshold and with a ranking being lower than a fifth threshold.

12. The storage medium according to claim 7, wherein the combined feature comprising at least one of:
    a user policy combined feature that includes at least one of a quantity of policies possessed by a user, user policy distribution, distribution of APIs authorized to a user, a current policy use frequency of a user, or an authentication success rate;
    a user service combined feature that includes at least one of a quantity and a list of cloud services possessed by a user, or a quantity and a use frequency of cloud service resources of a user; and
    a service policy combined feature that includes at least one of a quantity of policies of services, or a quantity of policies of APIs.

13. An authorization policy recommendation apparatus, comprising:
    a data obtaining component, configured to obtain account data based on a cloud service, provided authorization policy data, and service data;
    a feature extraction component, configured to extract an account feature, an authorization policy feature, and a service feature according to the account data, the provided authorization policy data, and the service data; and generate a combined feature according to a relationship among the account data, the provided authorization policy data, and the service data;
    a model training and generation component, configured to obtain a positive sample and a negative sample based on the account feature, the authorization policy feature, the service feature, and the combined feature; and perform model training according to the positive sample and the negative sample by using a machine learning algorithm, to generate a policy predictive recommendation model; and
    a predictive recommendation component, configured to perform predictive recommendation according to context scenario information of a current account in the cloud service based on the policy predictive recommendation model, obtain an authorization policy by screening, and recommend the authorization policy to the current account.

14. The apparatus according to claim 13, wherein
    the predictive recommendation component is configured to: when the context scenario information comprises interface information of a console of the current account in the cloud service or stage information of the current account in an authorization policy setup wizard, obtain, an authorization policy with a matching degree reaching a first threshold from a policy candidate set according to the interface information of the console of the current account in the cloud service or the stage information of the current account in the authorization policy setup wizard, and recommend the authorization policy to the current account.

15. The apparatus according to claim 13, wherein
    the data obtaining component is further configured to: after the predictive recommendation module recommends the authorization policy to the current account, obtain updated account data based on the cloud service, updated provided authorization policy data, and updated service data, and perform iterative optimization on the policy predictive recommendation model according to the updated account data, the update authorization policy data, and the updated service data.

16. The apparatus according to claim 13, wherein
    the predictive recommendation component is configured to: when multiple authorization policies are obtained by prediction, recommend the multiple authorization policies ranked according to weights to the current account.

17. The apparatus according to claim 16, further comprising:
    an information obtaining component, configured to: after the multiple authorization policies ranked according to a sequence are recommended to the current account, obtain click distribution information of the account based on the cloud service for the recommended authorization policies; and
    a weight adjustment component, configured to: according to the click distribution information, reduce a weight of an authorization policy with a quantity of clicks being less than a second threshold and with a ranking being higher than a third threshold, or increase a weight of an authorization policy with a quantity of clicks being greater than a fourth threshold and with a ranking being lower than a fifth threshold.

* * * * *